US010839031B2

(12) United States Patent
Kapoor et al.

(10) Patent No.: US 10,839,031 B2
(45) Date of Patent: Nov. 17, 2020

(54) SYSTEMS AND METHODS FOR PROVIDING A SERVICE DIRECTORY FOR AUTOMATIC SEARCH ENGINE INDEXING

(71) Applicant: Facebook, Inc., Menlo Park, CA (US)

(72) Inventors: Komal Kapoor, Bellevue, WA (US); Apaorn Tanglertsampan, Seattle, WA (US); Bradley Ray Green, Snohomish, WA (US); Meiying Li, Bellevue, WA (US); James Donovan, San Francisco, CA (US); Hannah Marie Hemmaplardh, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 280 days.

(21) Appl. No.: 15/297,007

(22) Filed: Oct. 18, 2016

(65) Prior Publication Data

US 2018/0107741 A1 Apr. 19, 2018

(51) Int. Cl.
*G06F 16/9535* (2019.01)
*G06F 21/62* (2013.01)

(52) U.S. Cl.
CPC ...... *G06F 16/9535* (2019.01); *G06F 21/6218* (2013.01)

(58) Field of Classification Search
CPC ......... G06F 17/30554; G06F 17/30867; G06F 16/9535
USPC ........................................................ 707/711
See application file for complete search history.

(56) References Cited

U.S. PATENT DOCUMENTS

| 6,912,407 B1* | 6/2005 | Clarke | H04M 1/275 |
| | | | 379/93.23 |
| 9,792,330 B1* | 10/2017 | Hawkins | G06F 17/3053 |
| 2004/0204958 A1* | 10/2004 | Perkins | G06Q 30/02 |
| | | | 705/1.1 |
| 2005/0021596 A1* | 1/2005 | Do | G06F 17/30873 |
| | | | 709/200 |
| 2008/0195605 A1* | 8/2008 | Wolf-Soffer | G06Q 30/06 |
| 2012/0110464 A1* | 5/2012 | Chen | H04W 4/21 |
| | | | 715/738 |
| 2012/0323951 A1* | 12/2012 | Caruntu | G06F 16/3334 |
| | | | 707/767 |
| 2013/0143587 A1* | 6/2013 | Williams | H04W 4/023 |
| | | | 455/456.1 |

* cited by examiner

*Primary Examiner* — Joshua Bullock
(74) *Attorney, Agent, or Firm* — Sheppard Mullin Richter & Hampton LLP

(57) ABSTRACT

Systems, methods, and non-transitory computer-readable media can present a service directory landing page comprising a plurality of selectable service category options associated with a plurality of pre-defined service categories. A search results page is presented, including one or more search results based on search criteria. Each of the one or more search results is associated with an entity page of a social networking system. The service directory landing page and the search results page are accessible without logging into the social networking system. Each entity page on the social networking system is accessible only when logged into the social networking system.

11 Claims, 7 Drawing Sheets

US 10,839,031 B2

SYSTEMS AND METHODS FOR PROVIDING A SERVICE DIRECTORY FOR AUTOMATIC SEARCH ENGINE INDEXING

FIELD OF THE INVENTION

The present technology relates to the field of social networking systems. More particularly, the present technology relates to systems and methods for providing a service directory to assist in automated search engine indexing.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system can include one or more pages associated with entities on the social networking system. For example, the social networking system can include one or more pages associated with merchants and/or service providers looking for exposure with consumers. In certain contexts, individual users can be distinguished from entity users on the social networking system. For example, an entity user or an entity account can be associated with a particular entity, and can be controlled by one or more administrators of the entity account, whereas an individual user can be associated with a particular individual. Both individual users and entity users can interact with one another on the social networking system by, for example, sending messages to one another, posting content to other users' accounts, sharing content publicly for publication to other users' newsfeeds, and the like. Interactions between users on a social networking system can be mutually beneficial. Participation in the social networking system by users can be encouraged and promoted by improving tools and features to facilitate interaction on the social networking system.

SUMMARY

Various embodiments of the present disclosure can include systems, methods, and non-transitory computer readable media configured to present a service directory landing page comprising a plurality of selectable service category options associated with a plurality of pre-defined service categories. A search results page is presented, including one or more search results based on search criteria. Each of the one or more search results is associated with an entity page of a social networking system. The service directory landing page and the search results page are accessible without logging into the social networking system. Each entity page on the social networking system is accessible only when logged into the social networking system.

In an embodiment, the search criteria include a service category and a particular location.

In an embodiment, the search results page comprises a plurality of alternative service category options associated with the service category.

In an embodiment, a selection of an alternative service category from the plurality of alternative service category options is received. An updated search results page is presented based on the selection of the alternative service category option.

In an embodiment, the search results page comprises a plurality of alternative location options associated with the particular location.

In an embodiment, a selection of an alternative location option from the plurality of alternative location options is received. An updated search results page is presented based on the selection of the alternative location option.

In an embodiment, the services directory landing page is associated with a particular location.

In an embodiment, the particular location is automatically determined based on user information.

In an embodiment, the plurality of selectable service category options are selected from the plurality of pre-defined service categories based on the particular location.

In an embodiment, the plurality of selectable service category options are selected from the plurality of pre-defined service categories based on a popularity of each service category of the plurality of pre-defined service categories in the particular location.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
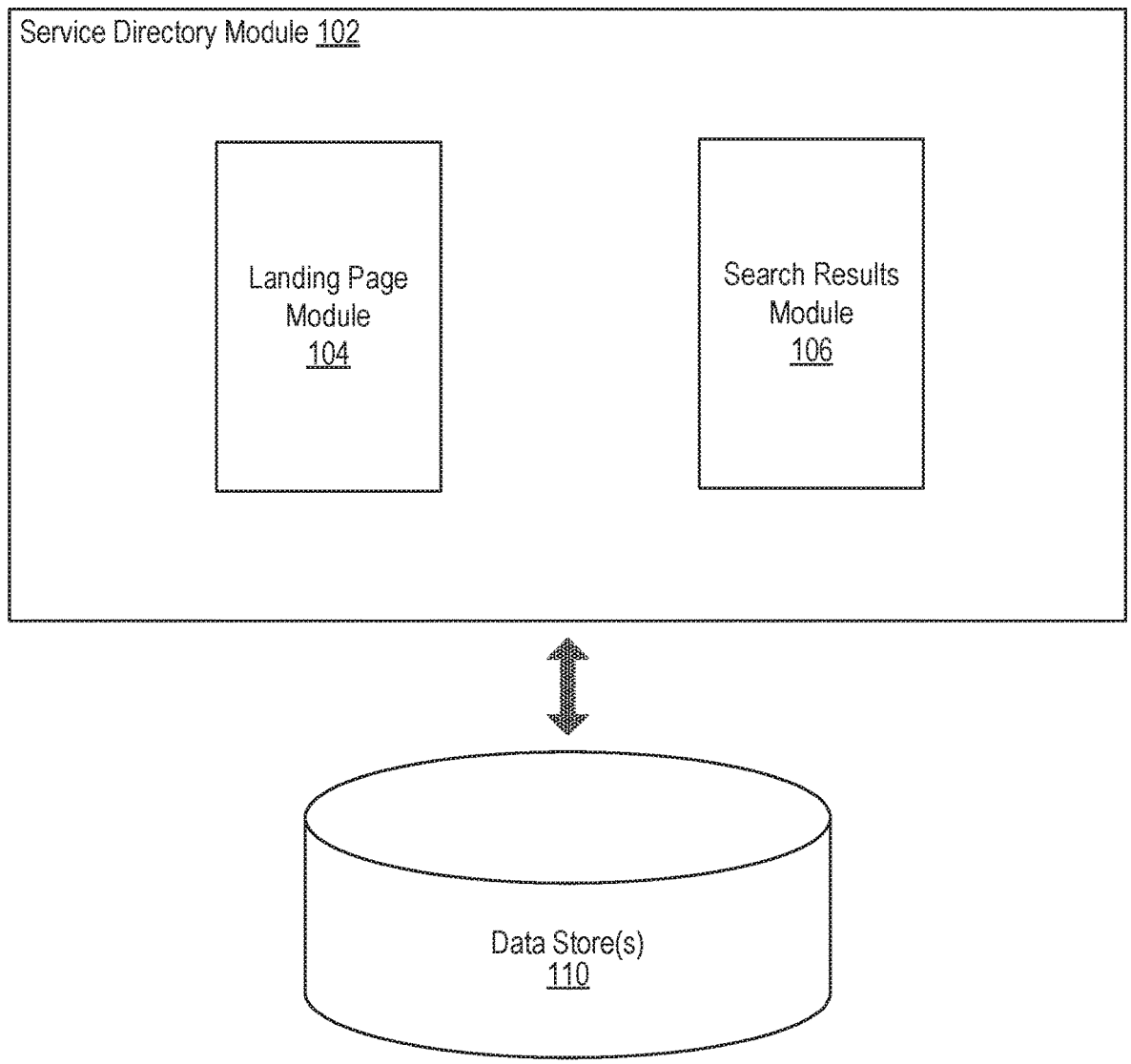
FIG. 1 illustrates an example system including a service directory module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Service Directory for Automated Search Engine Indexing

People often utilize computing devices (or systems) for a wide variety of purposes. Users can use their computing devices to, for example, interact with one another, access content, share content, and create content. In some cases, content items can include postings from users of a social networking system. The postings may include text and media content items, such as images, videos, and audio. The postings may be published to the social network for consumption by others.

A social networking system can include one or more pages associated with entities on the social networking system. For example, the social networking system can include one or more pages associated with merchants and/or service providers looking for exposure with consumers. In certain contexts, individual users can be distinguished from entity users on the social networking system. For example, an entity user or an entity account can be associated with a particular entity, and can be controlled by one or more administrators of the entity account, whereas an individual user can be associated with a particular individual. Both individual users and entity users can interact with one another on the social networking system by, for example, sending messages to one another, posting content to other users' accounts, sharing content publicly for publication to other users' newsfeeds, and the like. Interactions between users on a social networking system can be mutually beneficial. Participation in the social networking system by users can be encouraged and promoted by improving tools and features to facilitate interaction on the social networking system.

Under conventional approaches, entity pages on a social networking system can help merchants and/or service providers provide information about their businesses or services to consumers. However, entities with entity pages on a social networking system may wish to attract customers or consumers that are not members of the social networking system. The social networking system may also wish to have non-members of the social networking system access entity pages on the social networking system so as to encourage non-members to interact on and/or join the social networking system. However, under conventional approaches, it can be difficult for consumers to discover entity pages on a social networking system of which they are not a member. This may be the case, for example, because such entity pages are not easily found through third party search engines. Accordingly, such conventional approaches may engender these and other problems arising in computer technology.

An improved approach rooted in computer technology overcomes the foregoing and other disadvantages associated with conventional approaches specifically arising in the realm of computer technology. In general, a service directory can be provided on a social networking system that allows users to find entity pages on a social networking system. In various embodiments, the service directory can be publicly accessibly such that users may utilize the service directory regardless of whether or not the user is a user or member of the social networking system. The services directory can have a linking structure that maximizes public exposure of entity pages using selectable, e.g., click-through, options. This linking structure can, thereby, increase exposure of entity pages to automated search engine crawlers. By making various portions of the service directory publicly available, and permitting new entity pages to be discovered by clicking on various links within the service directory, entity pages on the social networking system can be easily discovered and indexed by automated search engine crawlers, thereby increasing visibility through third party search engines, even if the entity pages themselves are only accessible by users logged into the social networking system.

While the examples used herein may describe a service directory in which a user can search for service categories and/or entity pages on a social networking system, the approaches described herein can be adapted to searches for any user on a social networking system. As such, the approaches described herein need not be limited to searches for entity pages or service categories on a social networking system.

FIG. 1 illustrates an example system 100 including an example service directory module 102, according to an embodiment of the present disclosure. The service directory module 102 can be configured to provide a service directory in which a plurality of entity pages on a social networking system are categorized into various, pre-defined service categories. In certain embodiments, an entity page can be associated with one or more pre-defined service categories based on service category selections made by an administrator of the entity page. Each entity page can also be associated with one or more locations. An entity page can be associated with one or more locations based on location information specified by, for example, an administrator of the entity page. As will be described in greater detail herein, the service directory can be organized using a linking structure that is useful for optimizing automated search engine indexing. The linking structure allows an automated search engine crawler to be exposed to as many entity pages as possible by automatically clicking through links or selectable portions of the service directory. As the automated search engine crawler is exposed to more entity pages, the automated search engine crawler can index the entity pages by, for example, associating said entity pages with various service categories and locations.

The services directory can have a landing page on which a user can perform a search for entity pages on the social networking system. The landing page can also include service category options that are selectable by a user. When a user selects a service category option, a search can be run for entity pages associated with the selected service category option. Once the user runs a search by, for example, manually entering search criteria or selecting a service category option, the user can be presented with a search results page that includes one or more entity pages on the social networking system that match the search. In certain embodiments, the service directory landing page and the search results page can be publicly accessible, such that users are able to access these pages without logging into or being members of the social networking system. By making these pages publicly accessible, automated search engine crawlers are able to navigate and index the various entity pages that are listed as search results. In certain embodiments, the search results page can also include links to related service categories or related locations that, when selected, lead to new search results that may include different entity pages from the initial search. As the automated search engine crawler selects different related service categories or related locations, the automated search engine crawler will be exposed to more entity pages for indexing. Updated search results pages can also include even more related service categories and related locations, such that the automated search engine crawler can continue to click through links to expose the crawler to more and more entity pages.

As shown in the example of FIG. 1, the service directory module 102 can include a landing page module 104 and a search results module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the service directory module 102 can be implemented in any suitable combinations.

In some embodiments, the service directory module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the service directory module 102 can be implemented, in part or in whole, as software running on one or more computing devices or systems, such as on a user or client computing device. For example, the service directory module 102, or at least a portion thereof, can be implemented as or within an application (e.g., app), a program, or an applet, etc., running on a user computing device or a client computing system, such as the user device 610 of FIG. 6. In another example, the service directory module 102, or at least a portion thereof, can be implemented using one or more computing devices or systems that include one or more servers, such as network servers or cloud servers. In some instances, the service directory module 102 can, in part or in whole, be implemented within or configured to operate in conjunction with a social networking system (or service), such as the social networking system 630 of FIG. 6. It should be understood that there can be many variations or other possibilities.

The service directory module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the service directory module 102. For example, the data store 110 can store entity page information, service category groupings, historical service directory search information, and the like. It is contemplated that there can be many variations or other possibilities.

The landing page module 104 can be configured to provide a service directory landing page. The landing page can be the first page a user is exposed to when accessing the service directory. The landing page can be configured to allow a user to search for a service category. The landing page can also be configured to allow a user to select a service category from various service category options. For example, the user can be provided with a list of service category options. Service category options can be presented as, for example, selectable icons or selectable text. Searching for and/or selecting a service category can yield a set of search results of entity pages that satisfy search criteria (e.g., are associated with the selected service category). For example, if a user needs a plumber, the user can enter the search term "plumber" or "plumbing," or the user can select a service category option associated with the service category "plumbing." In this case, the user can be presented with a list of one or more entities that match the service category. In certain embodiments, the search may also include a location field to specify a particular location. In this way, search results can be limited to entities that are located near the specified location and/or service the specified location. In certain embodiments, as will be discussed in greater detail below, the landing page may be associated with a particular location, such that when a user selects a service category option listed on the landing page, a search is run for entity pages that match both the selected service category and the particular location.

In certain embodiments, the landing page can be available publicly, such that users can access the landing page regardless of whether or not they are signed into or members of a social networking system. By making the landing page available publicly, the landing page can be made available to automated search engine crawlers. As will be described in greater detail herein with respect to various example scenarios, the landing page provides a multitude of click-through options that allow an automated search engine crawler to continuously click through to new pages and perform new searches that expose the search engine crawler to more and more entity pages on the social networking system. The landing page module 202 is discussed in greater detail herein with respect to FIG. 2.

The search results module 106 can be configured to run a search and provide search results in a search results page. As mentioned, a search may be run based on various search criteria, such as user entered search terms (e.g., a service category, location information, an entity name, etc.) or selection of a service category option by a user. Search criteria can also include a location that is either entered by a user, or automatically determined by a computing system, as will be described in greater detail herein.

A search results page can include one or more search results corresponding to entity pages on a social networking system that match search criteria. Each search result can lead users to an associated entity page. In certain embodiments, entity pages on a social networking system may be accessible only to logged-in users of the social networking system, or certain portions of entity pages may be accessible only to logged-in users. As such, entity pages may not be completely accessible, or accessible at all, to automated search engine crawlers, which are typically not logged into a social networking system, and are, therefore, generally treated as non-members or logged out users. As discussed above, however, service directory search results pages can be made publicly accessible, so that search results are available to users regardless of whether said users are logged into or members of a social networking system. By making search results available publicly, they are also accessible to automated search engine crawlers. The automated search engine crawlers can then index all of the terms on a search results page and associate them with the various entity pages listed in the search results, even if entity pages themselves cannot be accessed by the crawler. As entity pages are indexed more frequently, and more frequently associated with various search terms (e.g., service categories or locations), entity pages may be more favorably ranked in third party search engine ranking algorithms.

Each search result can include information about an entity associated with the search result, such as the entity's name, a description of the entity, address, phone number, service categories associated with the entity, etc. Each entry can also include social context information for each entity. For example, social context information can include a rating and/or reviews for the entity (e.g., reviews posted to the social networking system by other users of the social networking system, or reviews posted to other sites), the number of users on the social networking system that have liked or followed the entity page, the number of users that have visited the entity page, and the like. Each entry in the search results list can also include one or more call to action buttons or icons. A call to action button can be selected by a user to take a particular action with respect to the entity and/or the entity page. For example, the user can select a "Like" call to action button to like a particular entity's page, or can select a "Message" call to action button to send a message to an entity's page. Certain call to action buttons can be presented by default for each entity page (e.g., a "Like" or "Message" button), while other call to action buttons can be specifically selected by an entity page. For example, certain entity pages may offer online appointment scheduling services, and can offer a "Book Now" call to action button that directs the user to the online appointment scheduling service. The information provided for each entity page can be indexed by an automated search engine crawler to associate each entity page with the information provided.

The search results module 106 can also be configured to provide one or more related search criteria. For example, the search results module 106 can provide a list of related service categories that are related to or similar to a current service category currently being explored by a user or search engine crawler. If the search engine crawler selects one of the related service categories, another search can be run based on the selected related service category. In certain embodiments, related service categories can be determined based on hierarchical groupings of categories. For example, the service directory can include tiered levels of categories, each level defining categories with greater specificity. For example, a first or highest tier of categories can be somewhat broad, e.g., automotive, home improvement, spa/beauty/personal care, etc. Each category in this highest level of categories can then include one or more sub-categories. For example, the "automotive" category can include the categories "auto repair," "car dealership," "car wash," etc.; the "home improvement" category can include the categories "cleaning," "electrician," "gardening," "mover," "painter," "plumbing," etc. Each of these narrower, lower level categories can further include their own lower level categories, e.g., the automotive repair category can include "glass repair," "engine repair," "body shop," etc. Based on these tiered groupings of categories, related service categories can be recommended to the user. For example, if the user has searched for "plumber," it can be determined that "plumber" is a sub-category of the higher level category "home improvement," and all other categories that fall under "home improvement" can be recommended to the user. In certain embodiments, other related categories that are not in the same grouping, but still related to the current service category can be recommended. For example, if a user searches for restaurants, related service categories may include service categories for after-dinner activities, even if the after-dinner activities do not fall into the same categorical grouping as the category "restaurants."

The related service categories provide selectable links that an automated search engine crawler can select to expose the search engine crawler to new entity pages. For example, if the search engine crawler initially selects the service category "plumbing," the search results may expose the search engine crawler to a variety of entity pages associated with the service category "plumbing." However, if "painter" is listed as a related service category, the automated search engine crawler can select, or click through to the "painter" service category, and be exposed to brand new search results for entity pages that are associated with the service category "painter." By providing this linking structure, the service directory can expose an automated search engine crawler to all entity pages on a social networking system associated with the service category "plumbing," and then expose the automated search engine crawler to all entity pages on the social networking system associated with the related service category "painter." It should be appreciated that the "painter" service category search results will have its own set of related service categories, that will lead the automated search engine crawler to additional search results and additional entity pages, and this can continue indefinitely until the search engine crawler has indexed all entity pages on a social networking system.

In certain embodiments, when a user runs a search for a particular service category (e.g., a crawler selecting a particular service category option), the search results can display category "breadcrumbs" indicative of any higher level categories to which the particular service category belongs. For example, if the search engine crawler initially selects a service category option for "plumbing," the service category "plumbing" may belong to the higher level category "home improvement," which itself may belong to the higher level category "services." In this example, the breadcrumbs might be displayed as follows: "Services>Home Improvement>Plumbing." These breadcrumbs on the search results page allow the search engine crawler to index these terms with each of the entity pages listed in the search results. As such, if an entity page is listed in the search results for "plumbing," the entity page will not only be associated by the crawler with the category "plumbing," but also "home improvement" and "service." The breadcrumbs can also be selectable so as to expose an automated search engine crawler to even more selectable links that lead to different search results and entity pages. For example, an automated search engine crawler can select the breadcrumb category "home improvement" to yield new search results for all entity pages associated with the category "home improvement." Presumably, the search results for the category "home improvement" will be different than those that were presented for the "plumbing" search results, and the automated search engine crawler will be exposed to different entity pages it can index.

The search results module 106 can also be configured to provide a list of alternative locations that are nearby or otherwise relate to the location specified in the current search criteria (e.g., within a threshold distance or threshold number of geolocations). For example, if a user searches for plumbers in Palo Alto, Calif., the user may be provided with alternative locations nearby Palo Alto, Calif., such as Mountain View, Calif.; San Jose, Calif.; Fremont, Calif., etc. By selecting one of these alternative locations, the user can run a new search based on the selected alternative location, e.g., search for plumbers in Mountain View, Calif. Certain service categories may be more amenable to a broader geographic search area, whereas other service categories may require a more localized search. For example, if a user is searching for a coffee shop in a particular neighborhood, it may not be particularly useful to recommend a coffee shop in a neighboring city; whereas if a user is searching for a plumber in a particular city, the user may still be interested in plumbers in nearby cities so long as those plumbers also service the user's city. As such, the alternative locations recommended to a user may vary based on the service category specified in the current search, and a location-sensitivity associated with the service category.

Similar to the discussion above with respect to related service categories and breadcrumb categories, presentation of selectable alternative locations can provide an automated search engine crawler with more selectable options that will yield new search results, i.e., new entity pages to be indexed. For example, if a search engine crawler is initially presented with search results for internet service providers in San Francisco, a set of entity pages for internet services providers near San Francisco can be presented. These entity pages can be indexed by the search engine crawler. The search results can include a list of alternative locations including Palo Alto, Sacramento, and Los Angeles. If the automated search engine crawler selects "Los Angeles," a new set of search results can be presented for internet service providers in Los Angeles, which can be also indexed by the crawler. The search results for internet service providers in Los Angeles can include different alternative locations, such as San Diego, Palm Springs, and Phoenix. By continuously clicking through alternative location recommendations, the automated search engine crawler can be exposed to entity pages for internet service providers from city to city to city until all entity pages for internet service providers in all cities have been indexed.

In certain embodiments, search results can be paginated, with each page of search results containing a pre-determined number of search results. The search results page can include links to access additional pages of search results. The paginated search results allow an automated search engine crawler to access all search results by clicking through the various page links, as opposed to, for example, a single page, infinite scroll presentation, which requires scrolling to load additional results, rather than clicking or selecting.

Figure 2:
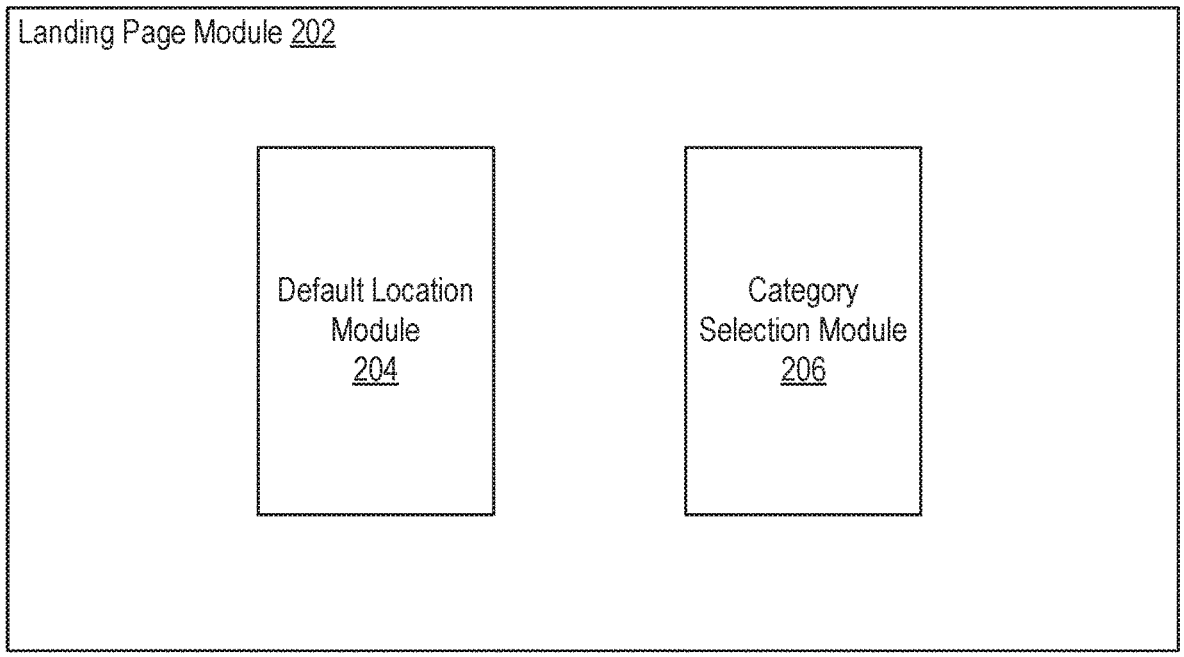
FIG. 2 illustrates an example landing page module, according to various embodiments of the present disclosure.

FIG. 2 illustrates an example landing page module 202 configured to provide a user with a landing page for navigating and/or searching a service directory, according to an embodiment of the present disclosure. In some embodiments, the landing page module 104 of FIG. 1 can be implemented as the landing page module 202. As shown in the example of FIG. 2, the landing page module 202 can include a default location module 204 and a category selection module 206.

The default location module 204 can be configured to determine a default location for a services directory landing page. In certain embodiments, when a user is presented with a landing page, presentation of the landing page can depend on a particular location determination by the default location module 204. For example, a background image of the landing page may be associated with the particular location, or service category options may be selectively presented based on the particular location.

The landing page can include a search function. The search function can allow a user to specify a particular location by manually entering location criteria to limit the search to entity pages that are associated with and/or relevant to the location specified by the user. However, if the "user" is an automated search engine crawler, the crawler may not be able to define or fill in location information. The default location module 206 can be configured to predict or determine a user's location, and automatically fill in location information. The user's location can be predicted and/or determined based on any available information. This can include, for example, a city of residence or hometown specified by the user on a social networking system, a location associated with the user's current IP address, a recent check-in posted to the social networking system by the user, a recent status update posted to the social networking system indicative of a particular location, previous searches performed by the user containing location information, etc. In certain embodiments, a location associated with an automated search engine crawler's IP address can be entered as a default location. If a location cannot be determined based on available information, a pre-determined default location can be entered. For example, if a user's location cannot be determined, it can be pre-determined that the location "Palo Alto, Calif." is automatically entered.

The category selection module 206 can be configured to present one or more service category options for selection by a user (such as an automated search engine crawler). As discussed above, in addition to a search function, the landing page can include one or more service category options that a user can select. Selection of a particular service category option can result in a search being run for the selected service category. A set of service categories can be pre-defined by, for example, a social networking system. In certain embodiments, a subset of service categories can be featured and/or selected for presentation. For example, a set of featured service categories may be presented in a more easily visible way, such as larger icons that have images associated with each featured service category. A subset of featured service categories can be selected based on various featured category selection criteria. For example, service categories can be ranked based on category ranking criteria. The category ranking criteria can include the popularity of the service category (e.g., the frequency with which the service category is selected and/or searched), to name one example. In certain embodiments, ranking of service categories can vary based on location information specified by the default location module 204. For example, service categories can be ranked based on popularity in the specified location. If the default location module 204 specifies a location of Seattle, Wash., the eight most popular service categories for Seattle can be displayed as featured service categories. There may be various groupings of service category options displayed. For example, a subset of ten featured category options can be selected and displayed with large image icons in a first portion of a user interface, and another subset of fifty categories can be selected and displayed textually in another portion of the user interface to give the user additional service category options to select. Alternatively, if it is feasible to display all service category options to a user, then the user may be presented with all service category options defined by the social networking system. For example, featured category options can be presented in a first portion of a user interface, and then a listing of all service category options can be listed in another portion of the user interface.

The various, selectable service category options listed on the landing page present an automated search engine crawler with multiple options for being exposed to and indexing entity pages on a social networking system. For example, if a landing page includes selectable service category options for Plumbing, Gardening, Painters, Massages, and Electricians, an automated search engine crawler can begin by selecting "Plumbing" to index all entity pages returned by a search for "Plumbing." The automated search engine crawler can then select "Gardening" to index all entity pages returned by a search for "Gardening," and so forth. By presenting a large number of selectable service category options on the landing page, an automated search engine crawler can be exposed to a very large number of entity pages. While it may be the case that search results are limited to a particular location determined by the default location module 204, as discussed above, each set of search results can include alternative location recommendations which can lead the automated search engine crawler to entity pages in alternative locations.

Figure 3:
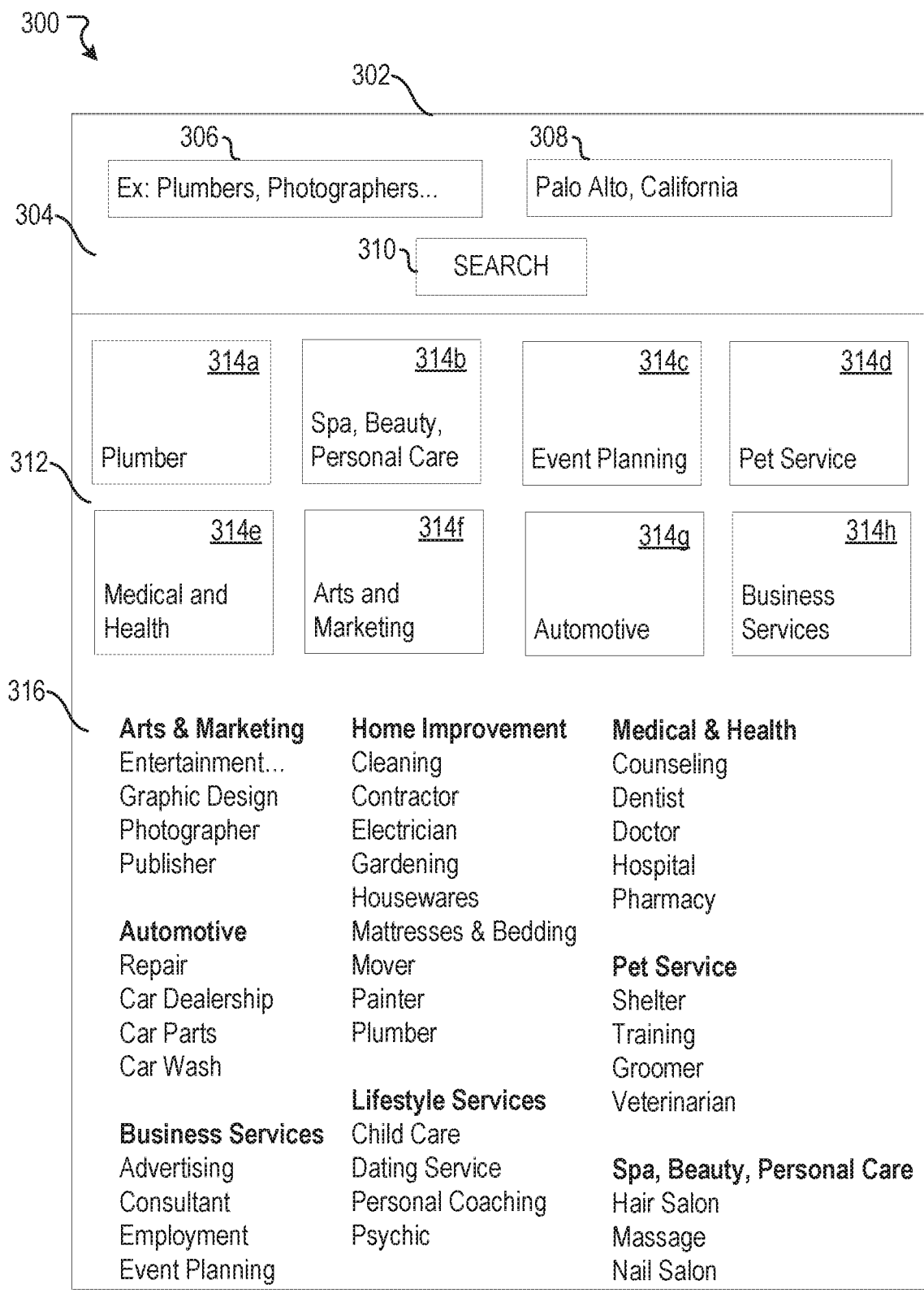
FIG. 3 illustrates an example scenario associated with providing a service directory landing page, according to an embodiment of the present disclosure.

FIG. 3 illustrates an example scenario 300 associated with providing a service directory landing page, according to an embodiment of the present disclosure. The example scenario 300 includes a landing page interface 302. The landing page interface 302 includes a search portion 304, which has a search box 306 for a user to enter search terms, a location box 308 for a user to enter location information, and a search button 310 for a user to run a search. In some cases, the user can be a non-member of a social networking system that provides the service directory landing page, or a member that is not logged into the social networking system. In other cases, the user can be logged into the social networking system. The location box 308 can be pre-filled with location information based on a prediction or determination of a current user's location, or a pre-determined default location. In certain embodiments, a background portion of the search portion 304 can include an image associated with the location information stated in the location box 308.

The landing page interface 302 also includes a featured categories portion 312. The featured categories portion 312 includes a subset of categories that have been selected from a larger set of categories based on featured category selection criteria. As discussed above, featured category selection criteria can vary. For example, in the example scenario 300, the featured categories portion 312 includes eight featured categories 314a-314h. These eight featured categories may have been selected based on a ranking of categories according to popularity for the determined location. In this example, the eight most popular categories for users in Palo Alto, Calif. would be displayed. Popularity may be determined based on the number of users who have searched for each category in a predetermined period of time, e.g., the last day, the last week, the last 30 days, or the last year. If a user, such as an automated search engine crawler, selects a featured category 314a-314h, a search can be run for entities associated with the selected category. For example, if a user selects the "arts and marketing" category 314f, a search can be run for entity pages associated with the category "arts and marketing" in Palo Alto, Calif.

Below the featured categories portion 312 is an additional categories portion 316, in which additional categories are listed. The additional categories can include the featured categories 314a-314h, or can exclude them. The additional categories portion 316 may include all service category options available for selection (e.g., all service categories defined by a social networking system), or may include a different subset of service categories. For example, if the featured categories portion 312 represents the top eight service categories based on ranking criteria, the additional categories portion 316 may include the top fifty service categories based on the same or different ranking criteria. The user can select any category within the additional categories portion 316 to run a search for entities associated with that service category.

Figure 4:
FIG. 4 illustrates an example scenario associated with providing service directory search results, according to an embodiment of the present disclosure.

FIG. 4 illustrates an example scenario 400 associated with providing search results in a search results page, according to an embodiment of the present disclosure. The example scenario 400 includes a search results interface 402. The search results interface 402 includes a search portion 404, which includes a search box 406 and a location box 408. The search portion 404 can display the search parameters or search criteria used for a current search. For example, in the example scenario 402, the user has run a search for plumbers in New York, N.Y. It should be understood that, while these search criteria may have been entered manually by a user, they may also be the result of a selection by a user, such as an automated search engine crawler. For example, the location "New York, N.Y." may have been automatically determined (for example, by the default location module 204), and the search term "plumbers" may be the result of a service category option selection by an automated search engine crawler.

The search results interface 402 displays search results for the current search in a search results portion 412. The search results portion 412 includes category breadcrumbs 422 to provide higher level category groups to which the searched category belongs. In the example scenario 400, the current search is for the category "plumbers," which falls under the higher level category "home improvement," which falls under the higher level category "services."

The search results portion 412 also includes search results 414, 416. Each search result 414, 416 is associated with a particular entity page on a social networking system. The first search result 414 is associated with the entity page for the entity "Green Boot Plumbing." The search result 414 includes information about Green Boot Plumbing, such as a rating (4.7 stars), a phone number, an address, business hours, a review of the entity, and a description of the entity.

The search results portion 412 also includes additional location recommendations 426. The additional location recommendations 426 can include locations nearby the location used for the current search. This may include, for example, neighboring cities or neighborhoods, or cities in the same metropolitan area or state. The additional location recommendations 426 may be selectable, such that if a user (such as an automated search engine crawler) selects one of the additional location recommendations, a new search can be run using the selected location. For example, if the user selects "Newark," a new search can be run for plumbers in Newark, and new search results presented.

The search results portion 412 also includes additional service category recommendations 428. The additional service category recommendations can include additional service categories that are in some way related to the service category in the current search. For example, the additional service category recommendations can include one or more service categories that are grouped into the same higher level category as the currently searched service category. In the example scenario 400, the currently searched service category, "plumbing," falls in the higher level category "home improvement." As such, the additional service category recommendations can include other service categories that fall within the higher level category "home improvement." If the currently searched service category has lower level categories associated with it, the additional service category recommendation can include these lower level categories. For example, if the service category plumber had associated with it lower level categories such as "copper plumbing," "toilet repair," "sink repair," "rain shower installation," these lower level categories could be listed in the additional service category recommendations 428. The additional service category recommendations can be selectable by the user to run a new search using the newly selected service category.

The search results interface 402 also includes selectable page numbers 430. The search results may be divided into pages, with each page of search results containing a predetermined number of search results. As discussed above, separating search results into discrete pages accessible by clicking on selectable links allows for an automated search engine crawler to move through the entire list of search results, indexing all entity pages along the way.

Figure 5:
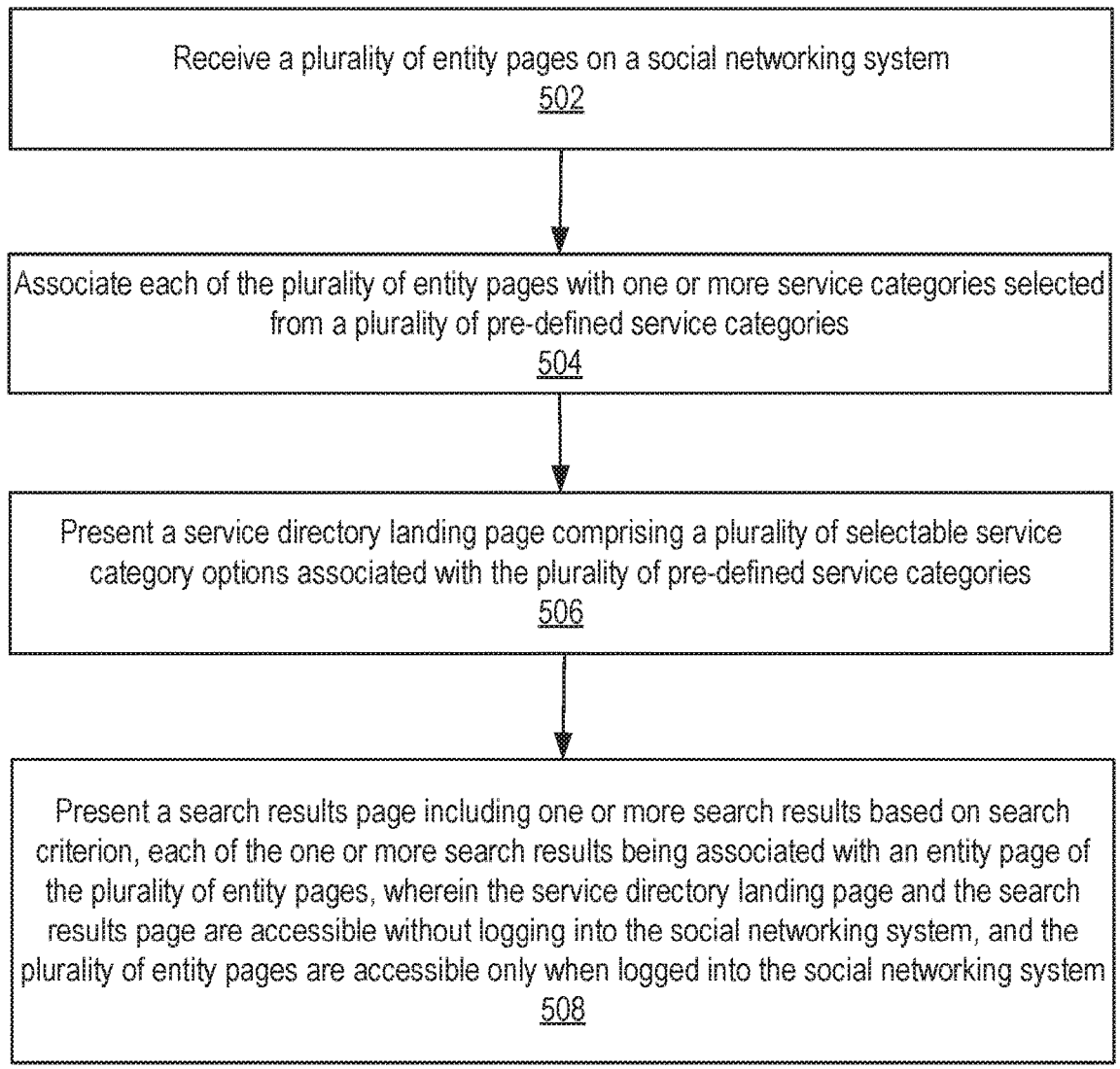
FIG. 5 illustrates an example method associated with providing a service directory for automated search engine indexing, according to an embodiment of the present disclosure.

FIG. 5 illustrates an example method 500 associated with providing a service directory for automated search engine indexing, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive a plurality of entity pages on a social networking system. At block 504, the example method 500 can associate each of the plurality of entity pages with one or more service categories selected from a plurality of pre-defined service categories. At block 506, the example method 500 can present a service directory landing page comprising a plurality of selectable service category options associated with the plurality of pre-defined service categories for selection by a user. At block 508, the example method 500 can present a search results page including one or more search results based on search criteria, each of the one or more search results being associated with an entity page of the plurality of entity pages. The service directory landing page and the search results page are accessible without logging into the social networking system, and the plurality of entity pages are accessible only when logged into the social networking system.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
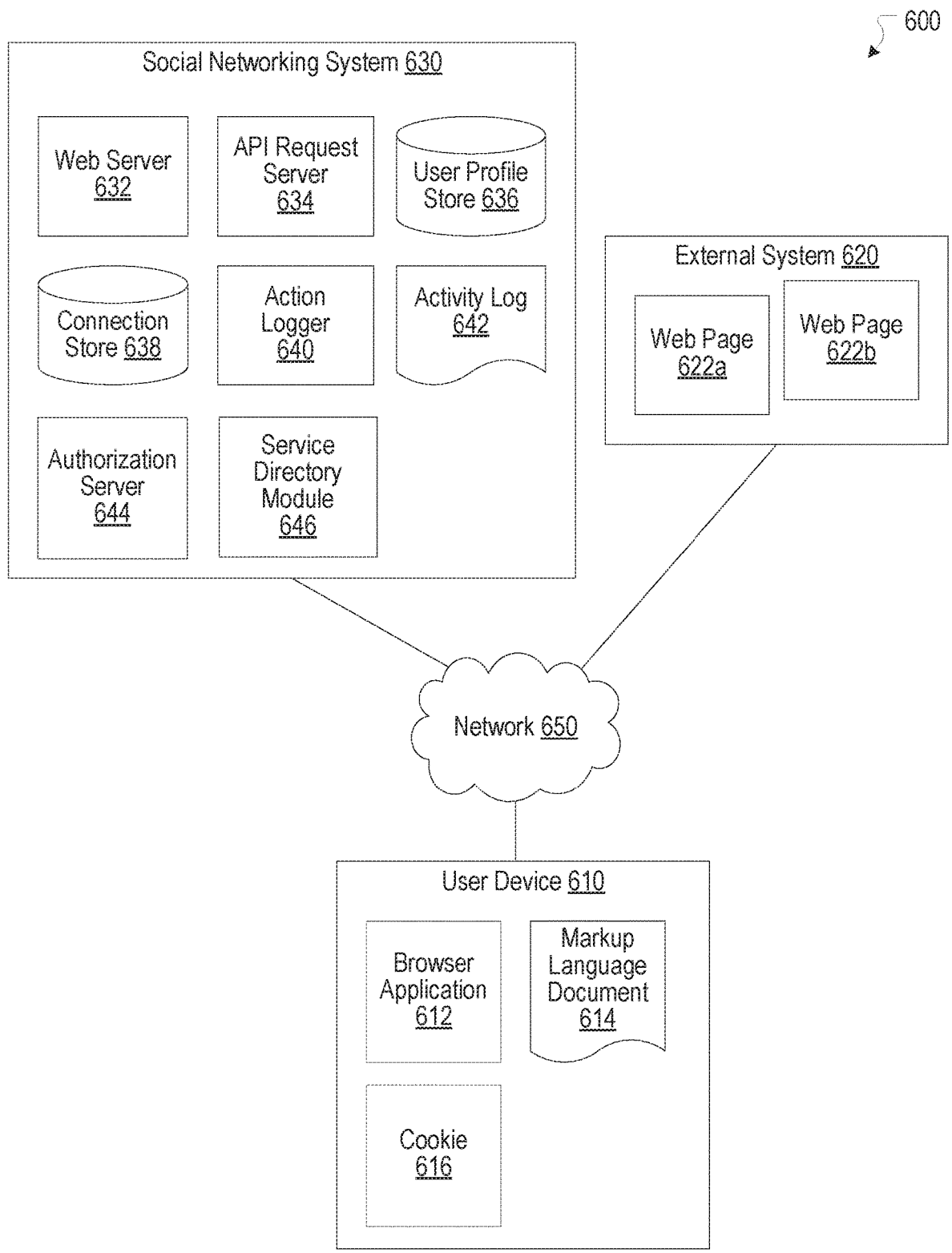
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a service directory module 646. The service directory module 646 can, for example, be implemented as the service directory module 102, as discussed in more detail herein. As discussed previously, it should be appreciated that there can be many variations or other possibilities. For example, in some embodiments, one or more functionalities of the service directory module 646 can be implemented in the user device 610.

Hardware Implementation

Figure 7:
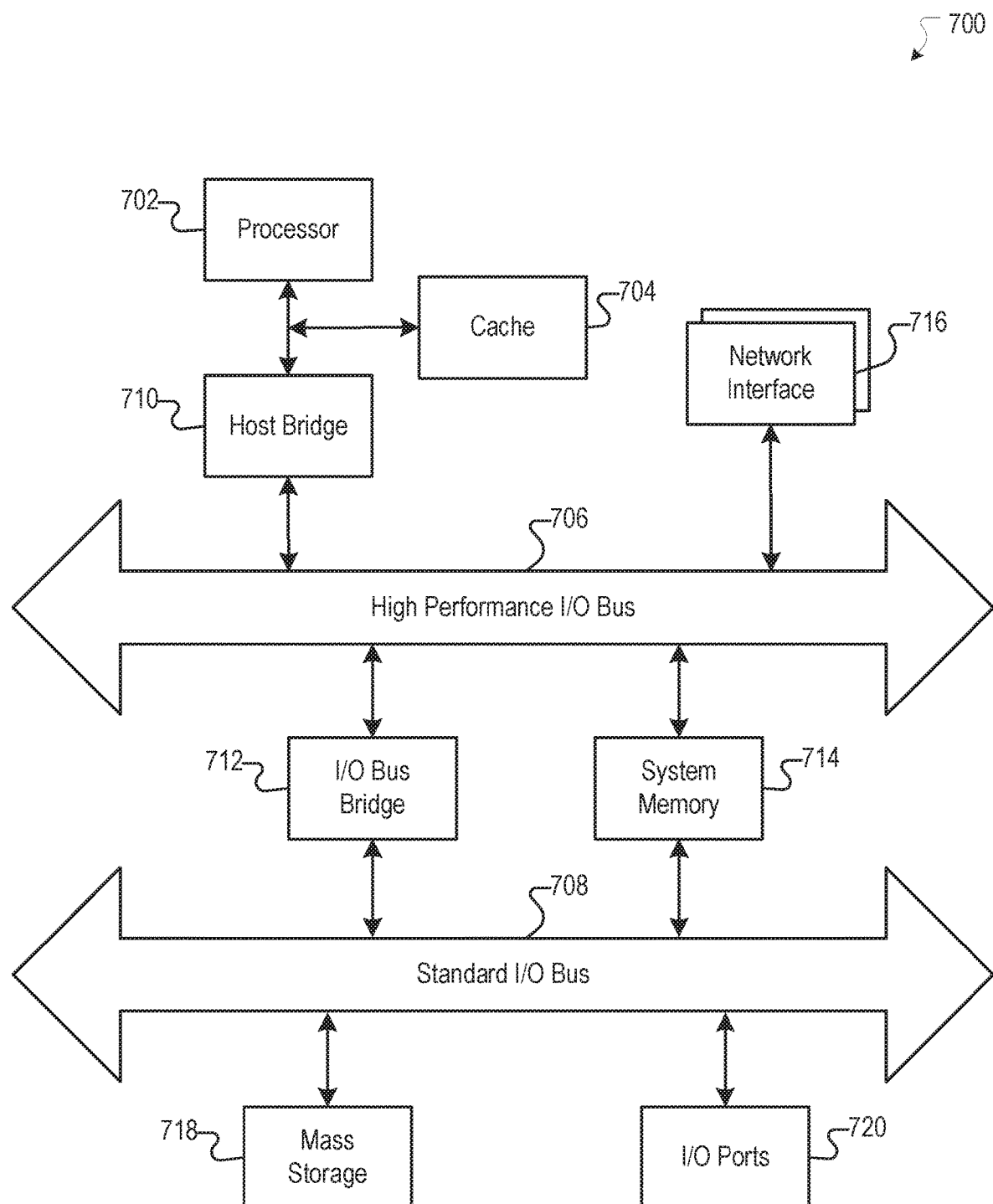
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing system, a service directory landing page comprising a plurality of selectable service category options associated with a plurality of pre-defined service categories; and
   providing, by the computing system, a search results page including one or more search results based on search criteria, the one or more search results associated with entity pages of a social networking system, wherein
   the search criteria include a service category and a particular location,
   the search results page comprises a first set of links to a plurality of additional service category options associated with the service category, the first set of links indexable by an automated search engine crawler,
   a new set of search results comprising a second set of links is generated in response to a selection by the automated search engine crawler of a link of the first set of links, the second set of links indexable by the automated search engine crawler,
   the service directory landing page and the search results page are accessible without logging into the social networking system, and
   at least one of the entity pages on the social networking system is accessible only when logged into the social networking system.

2. The computer-implemented method of claim 1, further comprising:
   receiving a selection of an additional service category option from the plurality of additional service category options; and
   providing an updated search results page based on the selection of the additional service category option.

3. The computer-implemented method of claim 1, further comprising:
   receiving a selection of an alternative location from a plurality of alternative locations; and
   providing an updated search results page based on the selection of the alternative location.

4. The computer-implemented method of claim 1, wherein the services directory landing page is associated with the particular location.

5. The computer-implemented method of claim 4, further comprising:
   automatically determining the particular location based on user information.

6. The computer-implemented method of claim 4, wherein the plurality of selectable service category options are selected from the plurality of pre-defined service categories based on the particular location.

7. The computer-implemented method of claim 6, wherein the plurality of selectable service category options are selected from the plurality of pre-defined service categories based on a popularity of each service category of the plurality of pre-defined service categories in the particular location.

8. A system comprising:
   at least one processor; and
   a memory storing instructions that, when executed by the at least one processor, cause the system to perform a method comprising:
   providing a service directory landing page comprising a plurality of selectable service category options associated with a plurality of pre-defined service categories; and
   providing a search results page including one or more search results based on search criteria, the one or more search results associated with entity pages of a social networking system, wherein,
   the search criteria include a service category and a particular location,
   the search results page comprises a first set of links to a plurality of additional service category options associated with the service category, the first set of links indexable by an automated search engine crawler,
   a new set of search results comprising a second set of links is generated in response to a selection by the automated search engine crawler of a link of the first set of links, the second set of links indexable by the automated search engine crawler, the service directory landing page and the search results page are accessible without logging into the social networking system, and at least one of the entity pages on the social networking system is accessible only when logged into the social networking system.

9. The system of claim 8, wherein the method further comprises receiving a selection of an additional service category option from the plurality of additional service category options; and providing an updated search results page based on the selection of the additional service category option.

10. A non-transitory computer-readable storage medium including instructions that, when executed by at least one processor of a computing system, cause the computing system to perform a method comprising:

providing a service directory landing page comprising a plurality of selectable service category options associated with a plurality of pre-defined service categories; and providing a search results page including one or more search results based on search criteria, the one or more search results associated with entity pages of a social networking system, wherein, the search criteria include a service category and a particular location, the search results page comprises a first set of links to a plurality of additional service category options associated with the service category, the first set of links indexable by an automated search engine crawler, a new set of search results comprising a second set of links is generated in response to a selection by the automated search engine crawler of a link of the first set of links, the second set of links indexable by the automated search engine crawler, the service directory landing page and the search results page are accessible without logging into the social networking system, and at least one of the entity pages on the social networking system is accessible only when logged into the social networking system.

11. The non-transitory computer-readable storage medium of claim 10, wherein the method further comprises receiving a selection of an additional service category option from the plurality of additional service category options; and providing an updated search results page based on the selection of the additional service category option.

\* \* \* \* \*